United States Patent
Tong et al.

(10) Patent No.: US 11,281,721 B2
(45) Date of Patent: Mar. 22, 2022

(54) AUGMENTING RELATIONAL DATABASE ENGINES WITH GRAPH QUERY CAPABILITY

(71) Applicant: International Business Machines Corporation, Armonk, NY (US)

(72) Inventors: Sui Jun Tong, Beijing (CN); Wen Sun, Beijing (CN); Yi Qin Yu, Beijing (CN); Eryu Xia, Changping (CN); Yong Qin, Zhong Guan Cun (CN)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 16/691,907

(22) Filed: Nov. 22, 2019

(65) Prior Publication Data

US 2021/0157850 A1    May 27, 2021

(51) Int. Cl.
 *G06F 16/901* (2019.01)
 *G06F 16/903* (2019.01)
 *G06F 16/28* (2019.01)

(52) U.S. Cl.
 CPC ........ *G06F 16/9024* (2019.01); *G06F 16/288* (2019.01); *G06F 16/90335* (2019.01)

(58) Field of Classification Search
 CPC ........... G06F 16/9024; G06F 16/90335; G06F 16/288
 See application file for complete search history.

(56) References Cited

U.S. PATENT DOCUMENTS

| | | | |
|---|---|---|---|
| 6,618,719 B1* | 9/2003 | Andrei | G06F 16/24547 |
| 7,260,563 B1* | 8/2007 | Priyadarshi | G06F 16/2456 |
| | | | 707/714 |
| 9,870,393 B2 | 1/2018 | Chen | |
| 2004/0010493 A1* | 1/2004 | Kojima | G06F 16/951 |
| 2011/0231418 A1* | 9/2011 | Biron | G06F 16/248 |
| | | | 707/756 |
| 2016/0342709 A1 | 11/2016 | Fokoue-Nkoutche et al. | |
| 2017/0323001 A1* | 11/2017 | Schwing | G06F 16/2365 |
| 2018/0121501 A1 | 5/2018 | Vaquero Gonzalez et al. | |
| 2018/0218065 A1 | 8/2018 | Fischer et al. | |
| 2019/0108258 A1* | 4/2019 | Poor | G06F 16/9038 |
| 2019/0311065 A1* | 10/2019 | Bross | G06F 16/3344 |
| 2019/0370407 A1* | 12/2019 | Dickie | G06F 8/443 |
| 2019/0384863 A1* | 12/2019 | Sirin | G06N 5/022 |
| 2020/0201860 A1* | 6/2020 | Vogelsgesang | G06F 16/24537 |

(Continued)

OTHER PUBLICATIONS

Hongbin Ma, Bin Shao, Yanghua Xiao, Liang Jeff Chen, Haixun Wang, "G-SQL: Fast Query Processing Via Graph Exploration," Proceedings of the VLDB Endowment, vol. 9, No. 12, 12 pages.

*Primary Examiner* — Richard L Bowen
(74) *Attorney, Agent, or Firm* — Patterson + Sheridan, LLP

(57) ABSTRACT

Techniques for augmenting relational databases with graph database capabilities are described. A graph database query requesting data from a graph database is received. The graph database includes a plurality of vertices and a plurality of edges. The graph database query is translated into a relational database query using one or more computer processors. The relational database query references a vertex table and an edge table in a relational database. Result data corresponding with the graph database query is retrieved from the relational database by executing the relational database query against the relational database.

20 Claims, 12 Drawing Sheets

(56) References Cited

U.S. PATENT DOCUMENTS

| | | | |
|---|---|---|---|
| 2020/0201909 A1* | 6/2020 | Das | G06F 16/9024 |
| 2020/0226156 A1* | 7/2020 | Borra | G06F 16/9024 |
| 2020/0285643 A1* | 9/2020 | Kadiam | G06F 11/3414 |
| 2021/0056104 A1* | 2/2021 | Tong | G06F 16/24534 |

* cited by examiner

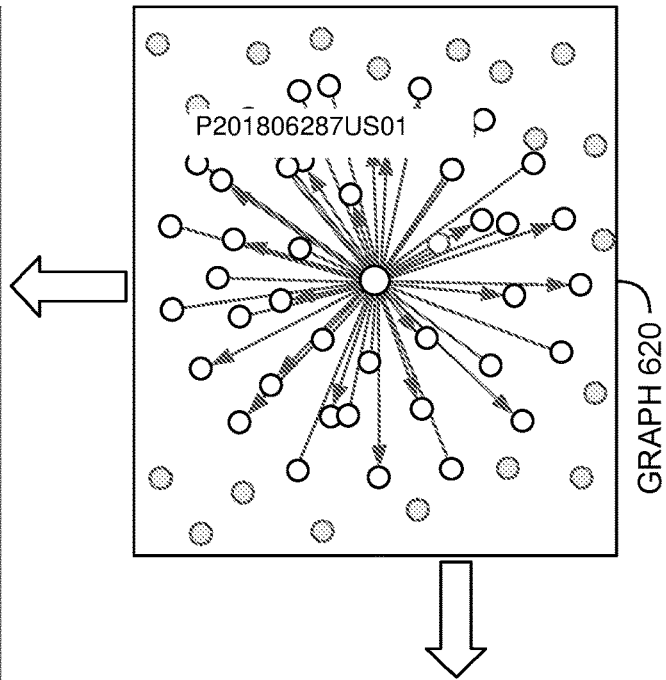

FIG. 6

VERTEX TABLE 630

| VID | LABEL | PROPERTIES |
|---|---|---|
| 1 | DIAGNOSIS | {„DIAGNOSIS_ID"="100", "DIAGNOSIS_NAME"="HYPERTENSION"} |
| 2 | OBSERVATION_1 | {„PATIENT_ID"="600", "OBSERVATION_ID"="200", "VALUE"="NORMAL_RANGE"} |
| 3 | OBSERVATION_2 | {„PATIENT_ID"="600", "OBSERVATION_ID"="201", "VALUE"="ABOVE_NORMAL"} |
| 4 | PATIENT | {„PATIENT_ID"="600", "PATIENT_NAME"="JANE DOE"} |

EDGE TABLE 640

| EID | IN_VERTEX | OUT_VERTEX | LABEL | PROPERTIES |
|---|---|---|---|---|
| 1 | 1 | 3 | „PATIENT TEST" | ... |
| 2 | 1 | 2 | „PATIENT TEST" | ... |
| 3 | 1 | 4 | „PATIENT DIAGNOSIS" | ... |

CONFIGURATION FILE 702

```
...
v.table=DGRAPH.PATIENT/DGRAPH.DIAGNOSIS/
DGRAPH.CHRONICDISEASE/OBSERVATION_1/
OBSERVATION_2
v.fixed_label=true
DGRAPH.PATIENT.vid+VID
DGRAPH.PATIENT.vlabel=patient
DGRAPH.DIAGNOSIS.vid=VID
DGRAPH.DIAGNOSIS.vlabel=diagnosis
DGRAPH.CHRONICDISEASE.vid=VID
DGRAPH.CHRONICDISEASE.vlabel=chronicDisease
OBSERVATION_1.vid=VID
OBSERVATION_1.vlabel=observation_1
OBSERVATION_2.vid=VID
OBSERVATION_2.vlabel=observation_2
e.table=DGRAPH.E_1/DGRAPH.E_2
e.fixed_label=true
DGRAPH.E_1.eid=RID
DGRAPH.E_1.label=e_1
DGRAPH.E_2.eid=RID
DGRAPH.E_2.label=E_2
e.outv=PARENT_VID
e.inv=CHILD_VID
...
```

VIRTUAL VERTEX TABLE 710

| VID | TYPE | PROPERTIES |
|---|---|---|
| 395 | diagnosis | {„DIAGNOSIS_ID"="64572002", „CONCEPT_NAME"="absinthe addiction"} |
| 399 | observation_1 | {„PATIENT_ID"="10000", "DIAGNOSIS_ID"= "64572394", "LOINC_TEST_ID" ="33903-6"} |
| 253939 | observation_1 | {„PATIENT_ID"="1", "DIAGNOSIS_ID"= "64572041", "ENCOUNTER_JOIN_ID" ="9039629"} |
| 4108952 | chronicDisease | {„PATIENT_ID"="10", "DIAGNOSIS_ID"= "64572326", "STATUS" ="complete"} |
| 7558739 | patient | {„PATIENT_ID"="1", "SUBSCRIPTION"="115"} |

VIRTUAL EDGE TABLE 720

| EID | PARENT_VID | CHILD_VID | LABEL | PROPERTIES |
|---|---|---|---|---|
| 1 | 4110010 | 1197092 | „patient-disease" | ... |
| 2 | 4110183 | 1197092 | „patient-disease" | ... |
| 3 | 4110010 | 1197106 | „patient-disease" | ... |
| ... | ... | ... | ... | ... |

*FIG. 7B*

CONFIGURATION FILE 802

```
...
v.table=PATIENT/DIAGNOSIS/CHRONICDISEASE/OBSERVATION_1/
OBSERVATION_2
v.fixed_label=true
PATIENT.vid=PATIENT_ID
PATIENT.vlabel=patient
DIAGNOSIS.vid=DIAGNOSIS_ID
DIAGNOSIS.vlabel=diagnosis
CHRONICDISEASE.id=VID
CHRONICDISEASE.vlabel=chronicdisease
CHRONICDISEASE.vproperties=DESC_TXT/STATUS
OBSERVATION_1.vid=VID
OBSERVATION_1.vlabel=observation_1
OBSERVATION_1.vproperties=LOINC_TEST_ID
OBSERVATION_2.vid=VID
OBSERVATION_2.vlabel=observation_2
OBSERVATION_2.vproperties=ENCOUNTER_JOIN_ID
e.table=CHRONICDISEASE/OBSERVATION_1/OBSERVATION_2
e.fixed_label=true
e.outv=PATIENT_ID
e.inv=DIAGNOSIS_ID
CHRONICDISEASE.elabel=chronicdisease
CHRONICDISEASE.eproperties=
OBSERVATION_1.elabel=observation_1
OBSERVATION_1.eproperties=OBSERVATION_DATE
OBSERVATION_2.elabel=observation_2
OBSERVATION_2.eproperties=
STD_OBSERVATION_HIGH_REF/STD_OBSERVATION_LOW_REF
...
```

FIG. 8B

VIRTUAL VERTEX TABLE 810

| ID | LABEL | PROPERTIES |
|---|---|---|
| PATIENT_ID | patient | {SUBSCRIPTION} |
| DIAGNOSIS_ID | diagnosis | {CONCEPT_NAME} |
| VID | chronicdisease | {DESC_TXT, STATUS} |
| VID | observation_1 | {LOINC_TEST_ID} |
| VID | observation_2 | {ENCOUNTER_JOIN_ID} |

VIRTUAL EDGE TABLE 830

| ID | INV | OUTV | LABEL | PROPERTIES |
|---|---|---|---|---|
| (PATIENT_ID, DIAGNOSIS_ID, chronicdisease) | PATIENT_ID | DIAGNOSIS_ID | chronicdisease | {} |
| (PATIENT_ID, DIAGNOSIS_ID, observation_1) | PATIENT_ID | DIAGNOSIS_ID | observation_1 | {OBSERVATION_DATE} |
| (PATIENT_ID, DIAGNOSIS_ID, observation_2) | PATIENT_ID | DIAGNOSIS_ID | observation_2 | {STD_OBSERVATION_HIGH_REF, STD_OBSERVATION_LOW_REF} |

FIG. 8C

| GRAPH OPERATION 910 | RELATIONAL QUERY 920 |
|---|---|
| g.V(ids) | FOR v in V_Tables:<br>SELECT * FROM v WHERE v.vid IN ids |
| g.V(ids).hasLabel(lbl) | SELECT * FROM V_Tables(lbl) WHERE v.vid IN ids |
| g.V(ids).has(property, value) | FOR v IN V_Tables:<br>SELECT * FROM v WHERE v.vid IN ids AND v.property = value |
| g.V(ids).outE() | FOR e IN E_Tables:<br>SELECT * FROM e WHERE e.inv IN ids |
| g.V(ids).bothE() | FOR e IN E_Tables:<br>SELECT * FROM e WHERE e.inv IN ids OR e.outv IN ids |
| g.V(ids).out() | FOR v IN V_Tables, e in E_Tables:<br>WITH a0 AS(SELECT outv AS vid FROM e WHERE inv IN ids GROUP BY outv),<br>a1 AS(SELECT * FROM a0 LEFT OUTER JOIN v AS a2 ON a0.vid=a2.vid)<br>SELECT * FROM a1 |
| g.V(ids).hasLabel(v_lbl).out(e_lbl) | WITH a0 AS(SELECT outv AS vid FROM e_lbl WHERE inv IN ids GROUP BY outv),<br>a1 AS(SELECT * FROM a0 LEFT OUTER JOIN v_lbl AS a2 ON a0.vid=a2.vid)<br>SELECT * FROM a1 |
| g.V(ids).outE().has(property,value) | FOR e IN E_Tables:<br>SELECT * FROM e WHERE e.inv IN ids AND e.property=value |
| g.V(id).has(property, value).outE() | FOR v IN V_Tables, e in E_Tables:<br>SELECT * FROM e LEFT OUTER JOIN v AS a0 ON v.vid=e.inv WHERE v.property=value |
| g.V().filter{it.outE.count()>=k} | FOR v IN V_Tables, e in E_Tables:<br>WITH a0 AS(SELECT inv FROM e WHERE COUNT(outv) > k GROUP BY inv)<br>SELECT * FROM a0 LEFT OUTER JOIN v AS a1 ON a0.inv=a1.vid) |

*FIG. 9*

AUGMENTING RELATIONAL DATABASE ENGINES WITH GRAPH QUERY CAPABILITY

BACKGROUND

Embodiments of the present invention relate to computer database technology, and more specifically, to augmenting relational databases with graph database capabilities.

Rapidly growing social networks, and other graph datasets, have increased demand for graph analysis systems. As a result, a large number of graph databases have emerged. These graph databases generally handle a graph-only query workload well. However, real life applications are often not limited to graph requires. Graph queries are, instead, only a part of an integrated heterogeneous analytics pipeline, which may include structured query language (SQL), machine learning (ML), graph queries, and other types of analytics. Further, SQL analytics and relational databases remain widely used for mission-critical business analytics.

As a result, graph queries are often combined with SQL analytics in practice. But existing graph databases are generally not suitable for the needs of combined systems. For example, many existing graph databases are standalone and cannot easily integrate with relational databases. These graph databases can force applications to import data into the specialized graph formats either at runtime or in a preprocessing step, perform the graph queries, and then export the result data to continue with the rest of the analytics pipeline. Further, graph databases with a limited hybrid approach generally require that relational data be replicated in a required form before graph queries can be applied. This wastes storage, or memory, and requires maintaining two consistent copies of the underlying data. As a result, when updates happen to the underlying relational data, the graph queries do not see the latest data.

SUMMARY

Embodiments described herein include a computer-implemented method. The method includes receiving a graph database query requesting data from a graph database, the graph database including a plurality of vertices and a plurality of edges. The method further includes translating, using one or more computer processors, the graph database query into a relational database query, the relational database query referencing a vertex table and an edge table in a relational database. The method further includes retrieving result data from the relational database corresponding with the graph database query by executing the relational database query against the relational database.

Embodiments described herein further include a system. The system includes one or more computer processors and a memory containing a program that, when executed on the one or more computer processors, performs an operation. The operation includes receiving a graph database query requesting data from a graph database, the graph database including a plurality of vertices and a plurality of edges. The operation further includes translating, using the one or more computer processors, the graph database query into a relational database query, the relational database query referencing a vertex table and an edge table in a relational database. The operation further includes retrieving result data from the relational database corresponding with the graph database query by executing the relational database query against the relational database.

Embodiments described herein further include a computer program product for responding to a graph database query. The computer program product includes a non-transitory computer-readable storage medium having computer-readable program code embodied therewith, the computer-readable program code executable by one or more computer processors to perform an operation. The operation includes receiving a graph database query requesting data from a graph database, the graph database including a plurality of vertices and a plurality of edges. The operation further includes translating, using the one or more computer processors, the graph database query into a relational database query, the relational database query referencing a vertex table and an edge table in a relational database. The operation further includes retrieving result data from the relational database corresponding with the graph database query by executing the relational database query against the relational database.

BRIEF DESCRIPTION OF THE SEVERAL VIEWS OF THE DRAWINGS

FIG. 6 illustrates storage of graph database information in relational database tables, according to one embodiment.

FIGS. 7A-B illustrate storage of graph database information in virtual vertex and virtual edge relational database tables, according to one embodiment.

FIGS. 8A-C further illustrate storage of graph database information in virtual vertex and virtual edge relational database tables, according to one embodiment.

FIG. 9 illustrates translation from graph database operations to relational database queries, according to one embodiment.

DETAILED DESCRIPTION

One or more techniques disclosed herein relate to a database management system (DBMS) graph query approach integrating a graph query into a relational database engine. As discussed above, graph databases are becoming more prevalent in analytics. These databases can provide low-latency results for graph queries, such as finding the neighbors of a vertex with certain properties, or retrieving the shortest path between two vertices. Examples of graph databases include Neo4j, JanusGraph, Sqlg, SQL-Graph, OrientDB, Sparksee, ArangoDB, InfiniteGraph, BlazeGraph, TigerGraph, and SQL Server's Graph Extension, among others.

But many modern systems include a combination of graph datasets and relational datasets. For example, graph data is already prevalent in existing relational databases. Many graph data sets and graph queries already existed before the boom in graph databases. As another example, the same data which powers existing SQL applications can often also be treated as graph data (e.g. data about relationships between objects or people) and can be used for new graph applications. Further, as discussed above, graph queries are often only a part of an integrated heterogeneous analytics pipeline, along with relational database queries, ML, and other analytics tools.

As discussed further below, a graph middle layer can be used to support graph queries for data stored in a relational database. In an embodiment, the graph middle layer is implemented as a layer in the relational database. Applying one or more techniques discussed below, graph queries and relational database queries can operate on the same data stored in the underlying relational database. A graph overlay approach is used to expose a graph view of the relational data.

Figure 1:
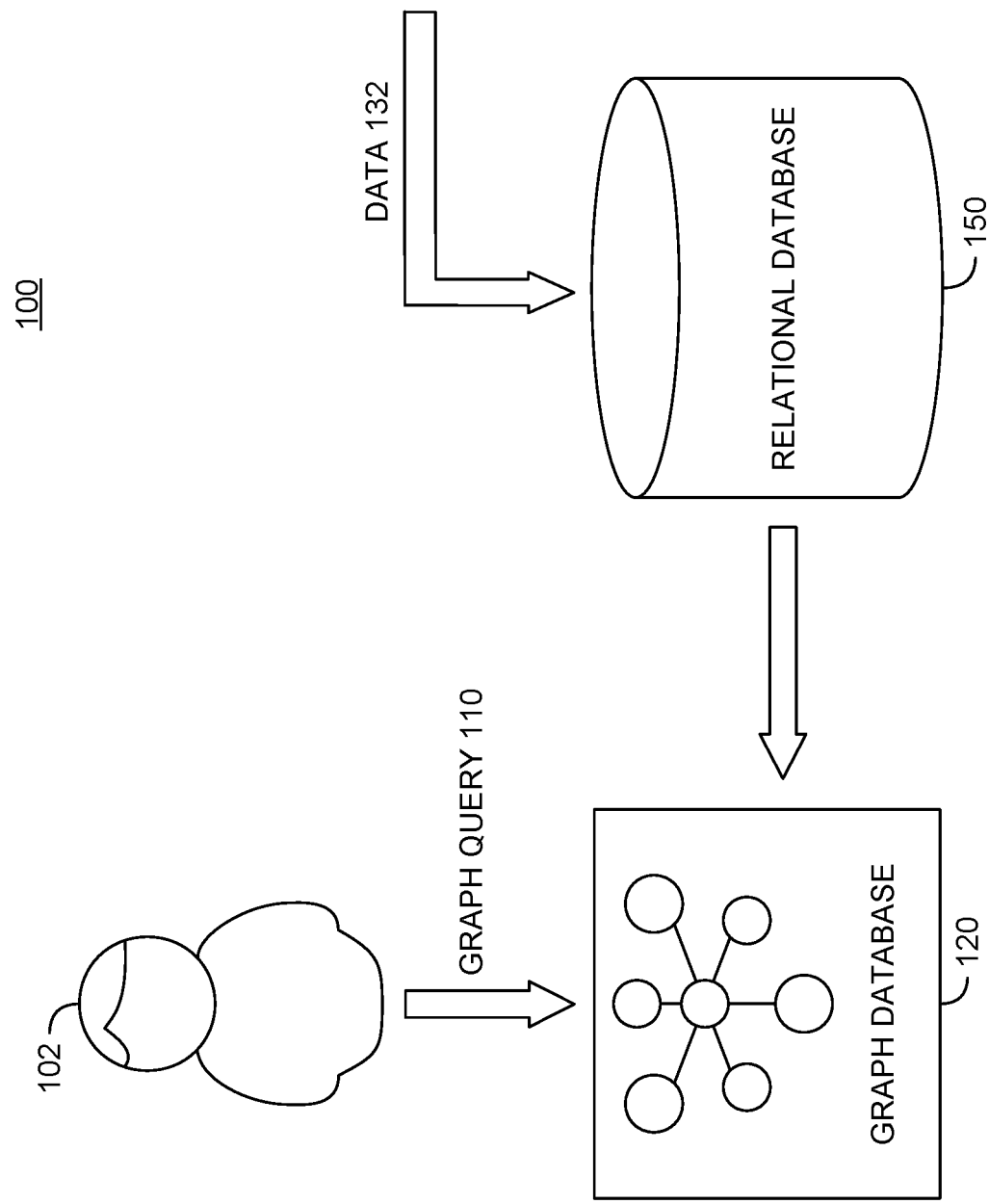
FIG. 1 illustrates a computing environment including both a relational database and a graph database, according to one embodiment.

FIG. 1 illustrates a computing environment 100 including both a relational database 150 and a graph database 120, according to one embodiment. In the embodiments discussed herein, a property graph is used as an example of a graph database 120. A property graph is made up of vertices and edges between vertices. Vertices can represent discrete objects, and edges can capture relationships between vertices. Both vertices and edges can have an arbitrary number of properties, represented as key-value pairs. Each vertex and edge is identified with an ID. In an embodiment, this ID uniquely identifies the vertex or edge within the graph database. Vertices and edges can further be tagged with labels to distinguish different types of objects and relationships in the graph. A property graph is merely one example of a suitable graph database, and other graph database types can also be used.

In an embodiment, data 132 is collected and stored in a relational database 150. The relational database 150 is used as a data source for the graph database 120. A user 102 enters a graph database query 110 and queries the graph database 120. In an embodiment, the graph query 110 returns data from the graph database 120, which is maintained in the relational database 150.

As discussed further below in relation to FIGS. 2-3, a graph middle layer can be used to provide results to the graph query based on the data stored in the relational database. This avoids having the graph database 120 maintain its own copy of the data to be queried. Requiring the graph database to maintain its own copy of the data, in volatile memory (e.g., random access memory (RAM)) or non-volatile longer term storage (e.g., a disk drive), would be inefficient. Compute power would be wasted by requiring reloading from the relational database 150. Further, the graph database 120 would waste storage, or memory, space by maintaining a copy of the data from the relational database 150. And the graph database 120 would need to be reloaded whenever the relational database 150 is updated, to maintain data integrity (e.g., the same data) between the relational database 150 and the graph database 120.

Figure 2:
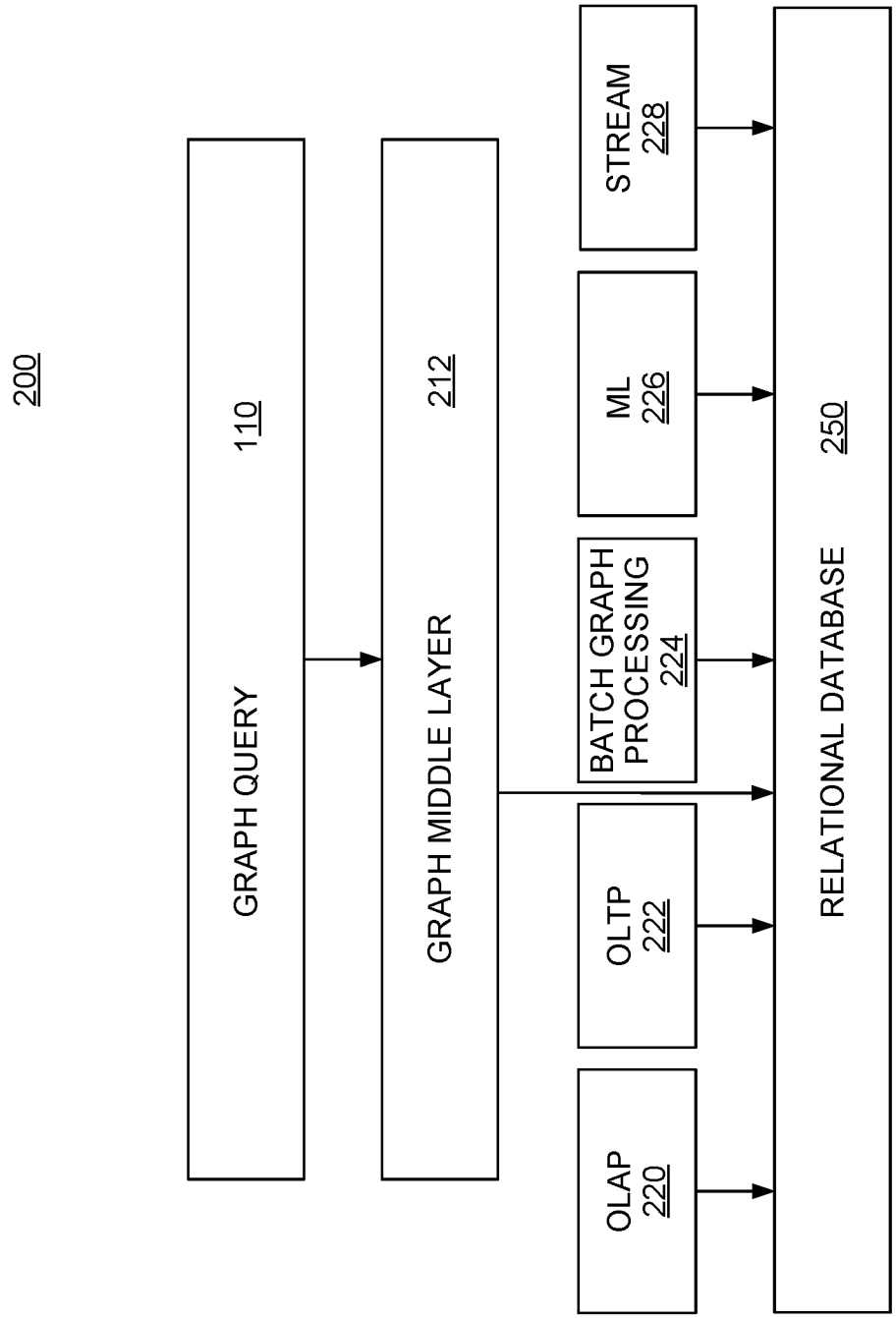
FIG. 2 illustrates a computing environment including a graph middle layer, according to one embodiment.

FIG. 2 illustrates a computing environment 200 including a graph middle layer 212, according to one embodiment. In an embodiment, a user enters a graph query 110. This graph query 110 is provided to a graph middle layer 212, which queries the relational database 250 and returns the results of the query. The graph middle layer 212 is discussed in more detail in relation to FIGS. 3 and 4, below. In an embodiment, the graph middle layer 212 is implemented as a layer in the relational database 250. Alternatively, the graph middle layer 212 is implemented outside of the relational database 250.

In an embodiment, the computing environment 200 includes numerous other components of a data analytics pipeline, all using the relational database 250. For example, the computing environment 200 includes an online analytical processing (OLAP) component 220. In an embodiment, the OLAP component 220 can be used to answer multi-dimensional analytical queries efficiently, using the relational database 250. As another example, the computing environment 200 includes an online transaction processing (OLTP) component 222. In an embodiment, the OLTP component 222 can be used to facilitate and manage transaction-oriented applications, using the relational database 250.

As another example, the computing environment 200 includes a batch graph processing component 224. In an embodiment, the batch graph processing component 224 can be used for efficient processing of graph data, using the relational database 250. As another example, the computing environment 200 includes a machine learning (ML) component 226. In an embodiment, the ML component 226 can perform a variety of machine learning tasks, using the relational database 250. As another example, the computing environment 200 includes a stream processing component 228. In an embodiment, the stream processing component 228 can manage continuous data streams, using the relational database 250.

In an embodiment, as illustrated, the graph middle layer 212 is integrated in to the computing environment 200 with the components 220-228. Each of these components, and the graph middle layer, uses the relational database 250 as the data source. This allows a graph query 110 to return data from the relational database 250, as part of an integrated analytical environment.

Figure 3:
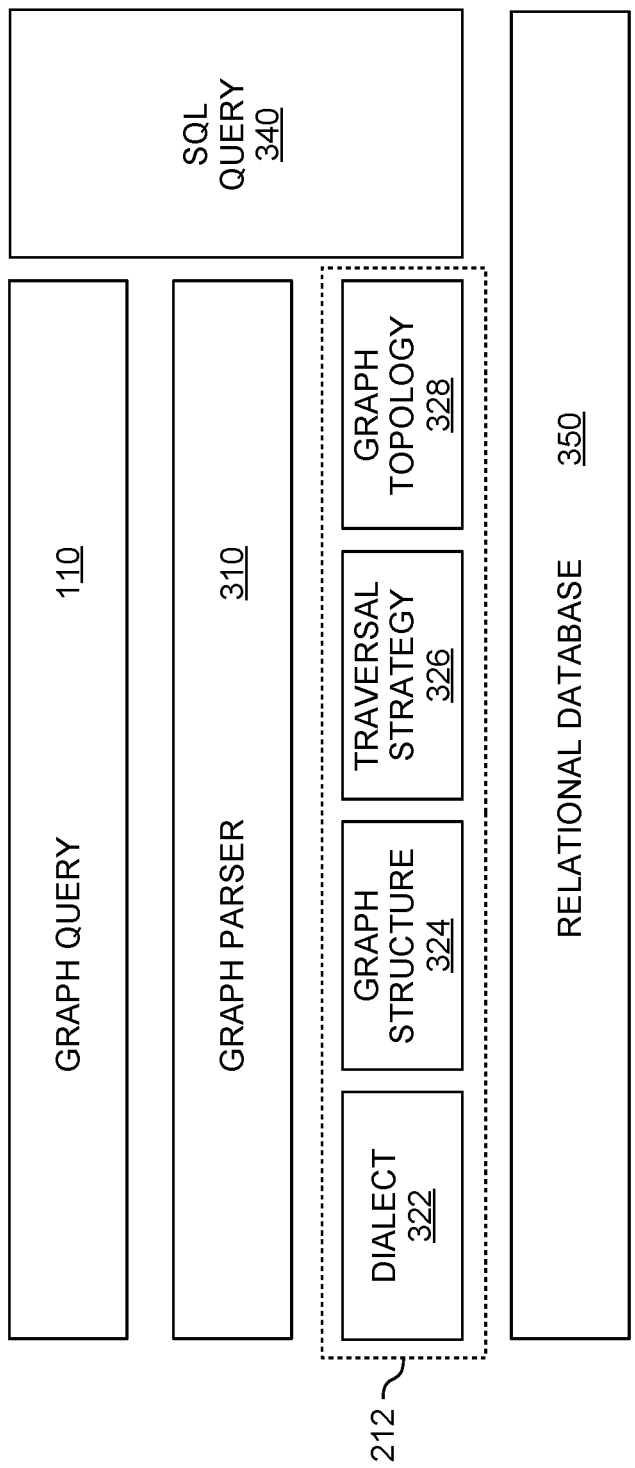
FIG. 3 illustrates executing a graph query on a relational database, using a graph middle layer, according to one embodiment.

FIG. 3 illustrates executing a graph query 110 on a relational database 350, using a graph middle layer 212, according to one embodiment. A user can enter a SQL query 340, which queries the relational database 350 in known fashion. SQL is merely one example of a relational query language, and any suitable relational query language can be used.

Alternatively, the user enters a graph query 110 using a suitable graph query language. For example, the graph query 110 can be in Gremlin, the graph traversal language of the Apache TinkerPop™ graph computing framework. This is merely one example, and any suitable graph query language can be used.

The graph query 110 is parsed using a graph query parser 310. For example, given a graph query 110 written in Gremlin, Apache TinkerPop™ can be used to parse the input Gremlin query and generate query plans (e.g., using suitable Application Programming Interface (API) calls). In an embodiment, the graph query parser 310 varies based on the query language used for the graph query 110. Any suitable graph query language can be used for the graph query 110, so long as a corresponding graph query parser 310 is used to generate a query plan from the graph query 110.

A graph middle layer 212 is used to query the relational database 350 based on the query plan output by the graph query parser 310. In an embodiment, the graph middle layer 212 includes four modules. A dialect module 322 is used to maintain connection pools with the relational database 350. For example, the dialect module 322 can be used to maintain SQL connection pools with the relational database 350. Further, the dialect module 322 can be used to generate query strings for the relational database 350. For example, the dialect module 322 can generate SQL query strings corresponding to the graph query 110. This is discussed in more detail with regard to FIG. 9, below.

The graph middle layer 212 further includes a graph structure module 324. The graph structure module 324 can define the graph structure to be used for executing the graph query 110 on the relational database 350. For example, the graph structure module 324 can define the types of edges and vertices, the labels for the edges and vertices, etc., corresponding to the relational database 350. In an embodiment, the graph structure module 324 is part of a pre-defined database schema, and uses configuration information (e.g., configuration information 502 illustrated in FIG. 5, and configuration files 702 and 802 illustrated in FIGS. 7A-B and 8A-C).

The graph middle layer 212 further includes a traversal strategy module 326. In an embodiment, the traversal strategy module 326 can be used to optimize the graph query 110 before generating a query on the relational database 350. For example, in a traditional graph database, all data related to a graph query may be loaded into memory. But this is likely not suitable for querying a relational database 350, given the typical large size of a relational database. The traversal strategy module 326 can optimize the graph query 110 by, for example, combining graph query components together, splitting them apart, etc., in order to allow for an efficient query of the relational database 350.

As one example, the traversal strategy module 326 can combine multiple steps into one composite step, and can translate the composite step into an optimized relational database query (e.g. an optimized SQL query). This can be done by starting from a step that accesses the basic graph structure, and attempting to fold subsequent steps into the prior step as much as possible (e.g., subsequent filter (predicate), property (projection), group, or aggregation steps). For example, assume we have a Gremlin graph query g.V( ).has('name', 'Alice').values('age', 'address'). Without optimization, these steps would be executed one by one and translated into separate relational database queries, without considering the neighboring steps. Instead, the traversal strategy module 326 can translate this Gremlin query into an optimized SQL query: SELECT age, address FROM VertexTable WHERE name='Alice'.

The graph middle layer 212 further includes a graph topology module 328. In an embodiment, the graph topology module 328 provides a graph topology for the relational database 350, based on the existing table schema for the relational database. For example, assume the graph query 110 relates to querying a graph of physician and patient data. The graph topology module 328 can provide a graph topology in which the vertices are doctors and patients and the edges are relationships between doctors and patients. The underlying data can be stored in tables in the relational database 350. This is illustrated further in relation to FIGS. 6-8, below.

Figure 4:
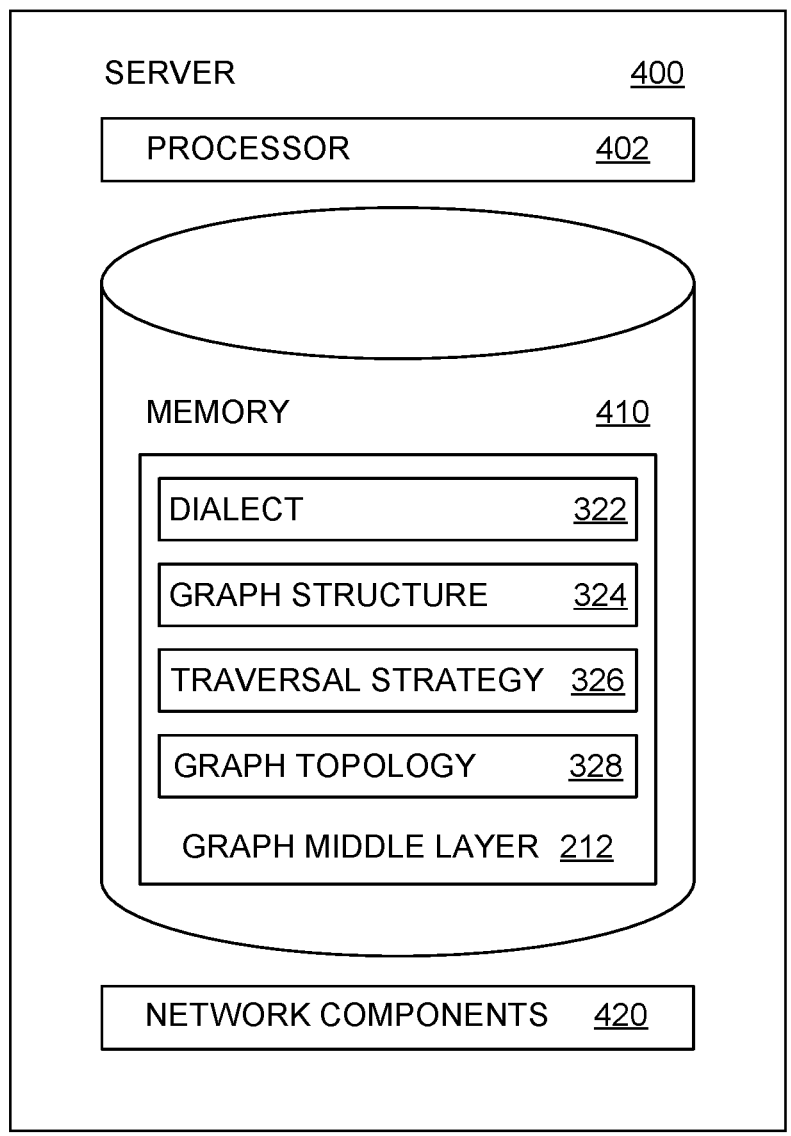
FIG. 4 is a block diagram illustrating a server implementing a graph middle layer, according to one embodiment.

FIG. 4 is a block diagram illustrating a server 400 implementing a graph middle layer 212, according to one embodiment. The server 400 includes a processor 402, a memory 410, and network components 420. The processor 402 generally retrieves and executes programming instructions stored in the memory 410. The processor 402 is included to be representative of a single central processing unit (CPU), multiple CPUs, a single CPU having multiple processing cores, graphics processing units (GPUs) having multiple execution paths, and the like. Further, the server 400 can be a single server computer, or can represent a collection of server computers (e.g., managed together).

The network components 420 include the components necessary for the server 400 to interface with a wireless or wired communication network. For example, the network components 420 can include WiFi or cellular network interface components and associated software, or wired network interface components (e.g., Ethernet components, fiber optic components, etc.). In an embodiment, the server 400 communicates with other components of an analytical environment (e.g., a relational database 250 or 350 as illustrated in FIGS. 2 and 3) using a suitable communication network (e.g., the internet, a wide area network (WAN), or a local area network (LAN)).

Although the memory 410 is shown as a single entity, the memory 410 may include one or more memory devices having blocks of memory associated with physical addresses, such as random access memory (RAM), read only memory (ROM), flash memory, or other types of volatile and/or non-volatile memory. The memory 410 generally includes program code for performing various functions related to use of the server 400. The program code is generally described as various functional "applications" or "modules" within the memory 410, although alternate implementations may have different functions and/or combinations of functions.

Within the memory 410, the graph middle layer 212 allows execution of a graph query on a relational database (e.g., the relational database 350 illustrated in FIG. 3). As discussed above in relation to FIG. 3, in an embodiment the graph middle layer 212 includes four modules: a dialect module 322, a graph structure module 324, a traversal strategy module 326, and a graph topology module 328. Further, in an embodiment the graph middle layer 212 is implemented as a layer in a relational database (e.g., the relational database 350 illustrated in FIG. 3). Alternatively, the graph middle layer 212 is implemented outside of the relational database.

Figure 5:
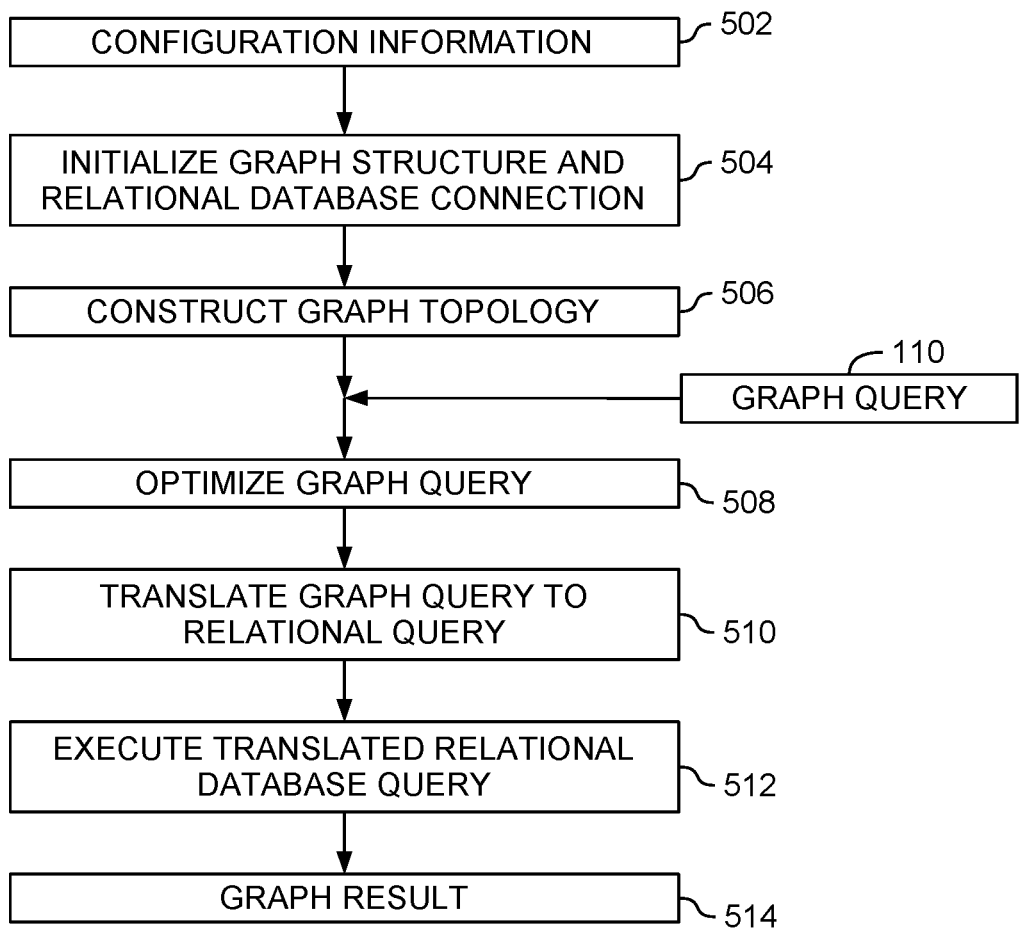
FIG. 5 is a flowchart illustrating executing a graph query on a relational database, according to one embodiment.

FIG. 5 is a flowchart 500 illustrating executing a graph query on a relational database, according to one embodiment. In an embodiment, configuration information 502 is provided as input for block 504, to initialize the graph structure and the relational database connection. For example, the configuration information 502 can describe the structure of a graph (e.g., a graph for the graph query 110 as illustrated in FIG. 3) and corresponding tables in a relational database (e.g., the relational database 350 illustrated in FIG. 3). The configuration information 502 can describe the vertices (e.g., type, label, etc.) and edges (e.g., type), and can delineate which tables in the relational database store information relating to the vertices and edges. This is further illustrated, for example, in FIGS. 6-8, below.

At block 504, a graph middle layer (e.g., the graph middle layer 212 illustrated in FIGS. 2-4) initializes the graph structure and the relational database connection. In an embodiment, the graph middle layer uses the configuration information 502 to initialize the graph structure. Further, in an embodiment, the graph middle layer opens and maintains relational database connections (e.g., with the relational database illustrated in FIG. 3). This allows the graph middle layer to query the relational database (e.g., at block 512).

At block 506, the graph middle layer constructs the graph topology. In an embodiment, the graph middle layer uses an existing schema for the relational database to construct this topology. For example, assume we are still using the example graph structure in which physicians and patients are vertices, and edges represent relationships between physicians and patients. An existing schema for the relational database will detail which tables in the relational database store patient information, which store physician information, and which describe the relationship between the two (e.g., a relationship table).

At block 506, the graph middle layer constructs the graph topology by mapping from the vertices (e.g., doctors and patients) to the relational database tables that store data about these vertices (e.g., a patient table and a physician tale). Further, the graph middle layer maps the edges (e.g., the relationship between patients and physicians) to the relational database table storing the edge information (e.g., a relationship table).

As illustrated, blocks 504 and 506 serve to initialize the graph middle layer to allow for queries of the relational database. In an embodiment, the graph middle layer can perform blocks 504 and 506 only when being initialized or setup (e.g., only when first initializing the graph middle layer). Alternatively, the graph middle layer can perform blocks 504 and 506 more frequently (e.g., periodically during operation, after a timeout period, or on every query).

Following block 506, a graph query 110 (e.g., the graph query 110 illustrated in FIGS. 2 and 3) is provided. At block 508, the graph middle layer optimizes this graph query 110. For example, in a traditional graph database, the database will typically load all data related to a given query into memory. But this is not viable in a relational database, because it would typically require loading much more data into memory. Therefore the graph middle layer optimizes the graph query 110 before translating it to a relational database query.

Numerous strategies can be used by the graph middle layer at block 506 to optimize the graph query 110. First, the graph middle layer can perform ID mapping. For example, given the physician and patient example described above, assume that physicians have a different ID (e.g., an employee ID) from patients (e.g., a social security number or medical record number). The graph middle layer can normalize these IDs to map to the same structure, for example by creating an overall index encompassing both doctors and patients. If the graph query 110 relates to physician or patient IDs, the graph middle layer can convert these different IDs to the normalized overall ID to optimize the graph query.

Second, the graph middle layer can use an element iterator to optimize the query. For example, instead of querying all entries for a particular large dataset (e.g., all patients), the graph middle layer can break the large dataset into subsets. The graph middle layer can then iteratively query each subset, and filter the results.

Finally, the graph middle layer can undertake particular strategies to optimize particular types of graph queries. For example, where a dataset is spread across multiple tables, the graph middle layer can use labels to identify a certain table, in order to avoid searching all of the tables. As another example, the graph middle layer can combine one "has" statement with another "has" statement in a previous query step, to reduce SQL queries. For example, in the graph query "graph.vertex.has.has," which would normally require two filtering operations, the two "has" operations can be combined to reduce SQL queries. These are merely examples, and any suitable optimization strategy can be used at block 508.

At block 510, the graph middle layer translates the graph query 110 (after optimization at block 508) to a relational database query (e.g., a SQL query). In an embodiment, the exact remaining graph query is translated into a SQL query. For example, using our physician and patient example, the graph query "graph.physician" can be translated into the SQL query "select all physicians from table physician." This is discussed further with regard to FIG. 9, below.

At block 512, the graph middle layer executes the translated relational database query on the relational database. Further, the graph middle layer generates a graph structure for the result and fills the graph structure with the result. This creates the graph result 514, which includes data retrieved from a relational database structured to match a graph result.

FIG. 6 illustrates storage of graph database information in relational database tables, according to one embodiment. In an embodiment, a graph 620 includes a number of vertices (represented by circles) and edges (represented by lines) between vertices. In one embodiment, the vertices can be represented by a vertex table in a relational database. This is illustrated in FIG. 6. Alternatively, or in addition, the vertices can be represented by multiple tables. This is illustrated in FIGS. 7A-B and 8A-C, below.

As illustrated in FIG. 6, a vertex table 630 includes three columns. The first column includes a vertex identifier (VID) used to identify each vertex. In an embodiment, the VID is a normalized identifier relating to the vertices stored in the vertex table 630. The second column includes a label for each vertex. The third column includes a number of properties associated with each vertex. This is merely one example, and any suitable number of columns can be used.

In the example illustrated in FIG. 6, the vertex table 630 includes a first row with a VID 1, a label Diagnosis, and a collection of properties {"Diagnosis_ID"="100", "Diagnosis_Name"="hypertension"}. In an embodiment, the properties relate to attributes associated with the vertex. For example, the vertex with the VID 1 relates to a diagnosis of hypertension, with a diagnosis identifier of 100. The vertex with the VID 2 relates to an observation of a patient. The patient has an identifier of 600, the observation has an identifier of 200 (e.g., a unique identifier for that observation), and the observation has a value in the normal range. The vertex with the VID 4 relates to a patient with the identifier 600 (e.g., a unique identifier for the patient) and the name Jane Doe. These are merely example, and any suitable columns, rows, and properties can be used.

FIG. 6 further includes an edge table 640. In one embodiment, the edges in graph 620 can be represented by the edge table 640 in a relational database. This is illustrated in FIG. 6. Alternatively, or in addition, the edges can be represented by multiple tables. This is illustrated in FIGS. 7A-B and 8A-C, below.

As illustrated in FIG. 6, the edge table 640 includes three rows and five columns. The columns include an edge identifier (EID), an in_vertex (e.g., a first vertex to which the edge is connected), an out_vertex (e.g., a second vertex to which the edge is connected), a label, and properties relating to the edge. For example, the first row represents an edge in the graph 620 with an EID of 1, that connects a vertex with a VID of 1 (e.g., the vertex in the first row of the vertex table 630) to a vertex with a VID of 3 (e.g., the vertex in the third row of the vertex table 630). This edge has a label "patient-test", and has properties relating to the edge. In an embodiment, the vertex table 630 and the edge table 640, together, can be used to represent the graph 620 in a relational database.

Figure 7A:
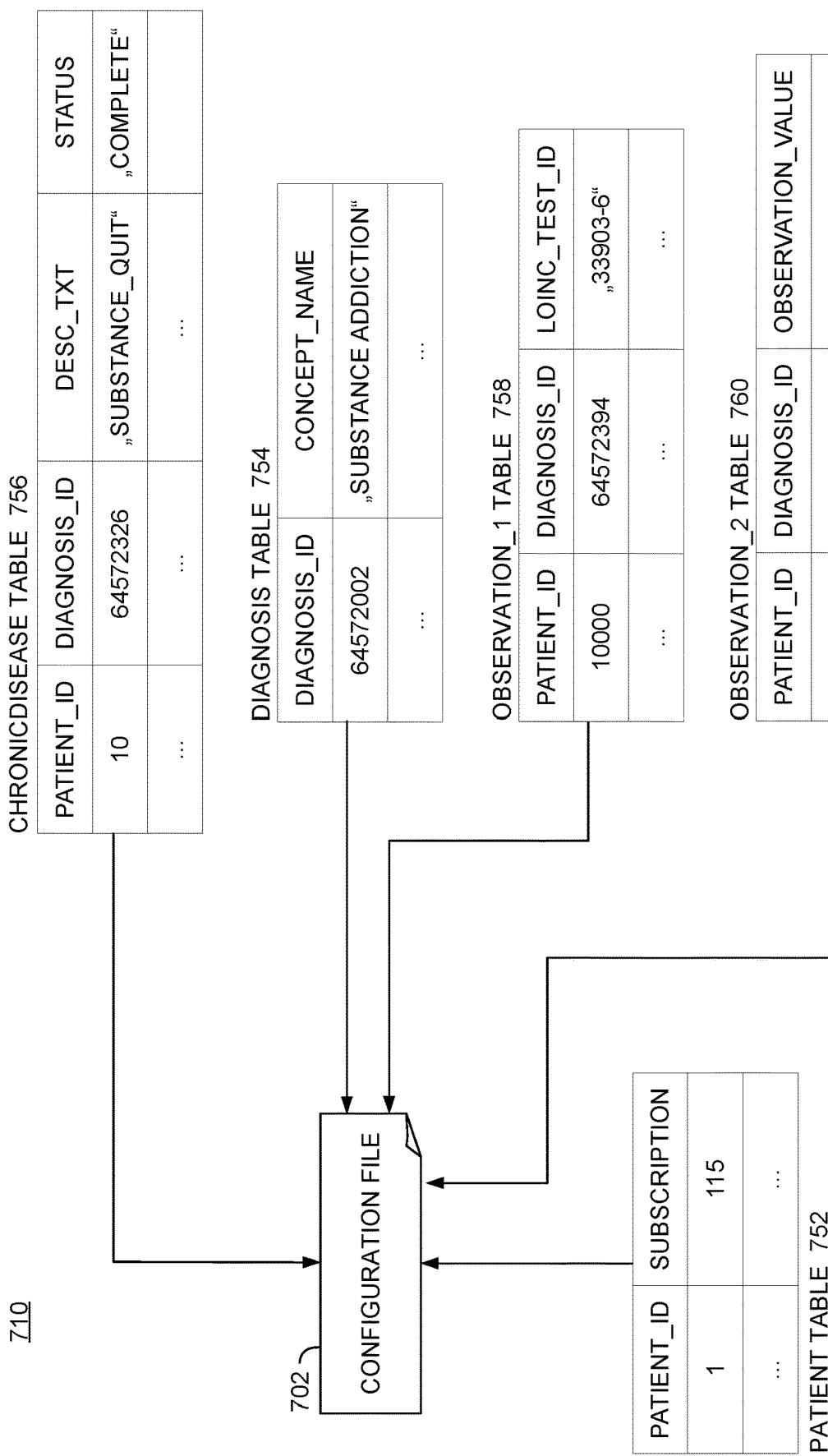

FIGS. 7A-B illustrate storage of graph database information in virtual vertex and virtual edge relational database tables, according to one embodiment. As discussed above in relation to FIG. 6, in some circumstances vertices and edges from a graph database can each be represented in a respective graph table in a relational database. Alternatively, as illustrated in FIGS. 7A-B, vertices from a graph database can be represented in a virtual vertex table 710, made up of multiple individual relational database tables (e.g. individual vertex tables). Similarly, edges from a graph database can be represented in a virtual edge table 720, made up of multiple individual relational database tables (e.g., individual edge tables). In an embodiment, a configuration file (e.g., the configuration file 702 illustrated in FIGS. 7A-B) can be used for the virtual vertex and edge tables.

FIG. 7A illustrates a virtual vertex table 710. The virtual vertex table 710 is made up five relational database tables: a patient table 752, a diagnosis table 754, a chronic disease table 756, an observation_1 table 758, and an observation_2 table 760. In an embodiment, these five relational database tables are used in place of the single vertex table 630 illustrated in FIG. 6. That is, each of these tables 752-760 stores data for a type of vertex in a graph database. For example, the patient table 752 stores data related to patients, the diagnosis table 754 stores data related to diagnoses of illnesses, the chronic disease table 756 stores data related to chronic diseases, the observation_1 table stores data related to a first type of observation for a patient (e.g., a first type of medical test), and the observation_2 table stores data related to a second type of observation for a patient (e.g., a second type of medical test).

In an embodiment, a configuration file 702 is used to map data between tables so that the virtual vertex table 710 can be used in place of a single vertex table (e.g., the vertex table 630 illustrated in FIG. 6). While FIG. 7A illustrates a virtual vertex table 710, these same techniques can be used for a virtual edge table. A configuration file 702 can be used to map several tables representing different types of edges, so that the virtual edge table can be used in place of a single edge table (e.g., the edge table 640 illustrated in FIG. 6).

FIG. 7B illustrates a configuration file 702 used to map a virtual vertex table 710 and a virtual edge table 720. In an embodiment, the configuration file 702 maps graph database vertices and edges to underlying relational database tables, effectively creating a single virtual vertex table 710 and a single virtual edge table 720.

For example, the first line of the configuration file 702 illustrated in FIG. 7B sets the vertex table ("v.table") to be made up of PATIENT, DIAGNOSIS, CHRONICDISEASE, OBSERVATION_1, and OBSERVATION_2 tables. These can be, for example, the tables 752-760 illustrated in FIG. 7A. The configuration file further maps from vertex values to corresponding columns in relational database tables. The configuration file 702 further sets the edge table ("e.table") to be made up of E_1 and E_2 tables, and maps the edge properties (e.g., "eid") to relational database columns.

Figure 8A:
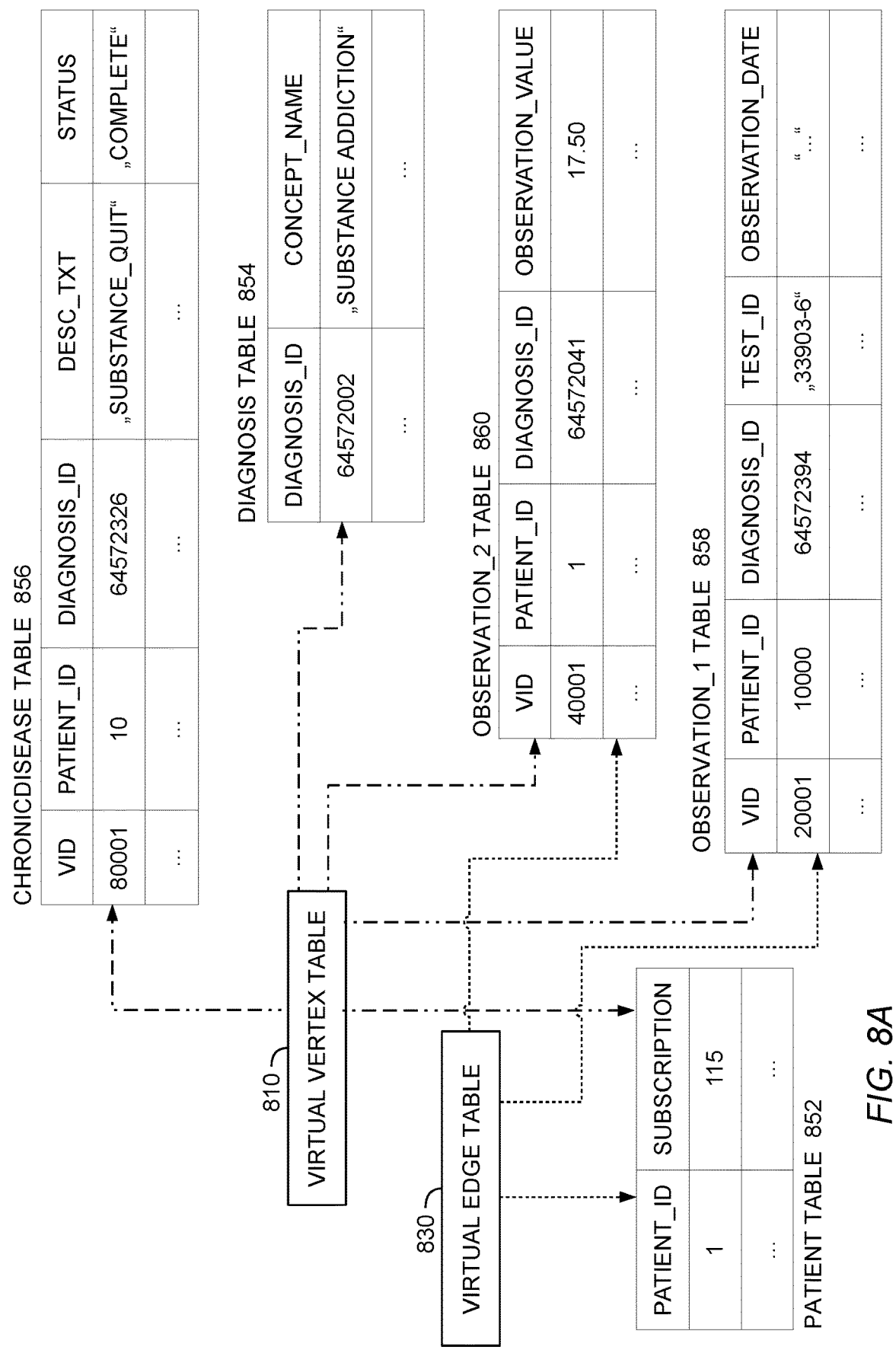

FIGS. 8A-C further illustrate storage of graph database information in virtual vertex and virtual edge relational database tables, according to one embodiment. As illustrated above in FIGS. 7A-B, in an embodiment a virtual vertex table 710 and a virtual edge table 720 can be used to represent graph database vertices and edges in relational database tables. In that embodiment, the virtual edge table 720 is a separate virtual table with its own normalized identifiers (e.g., "EID" illustrated in the virtual edge table 720 in FIG. 7B), etc.

Alternatively, as illustrated in FIGS. 8A-C, a virtual edge table 830 can use values embedded in a virtual vertex table 810. This is, instead of a separate virtual edge table 720, as illustrated in FIGS. 7A-B, the virtual edge table 830 can be made up of relationships between the relational database tables that make up the virtual vertex table 810.

FIG. 8A illustrates a virtual vertex table 810 made up of five relational database tables: a patient table 852, a diagnosis table 854, a chronic disease table 856, an observation_1 table 858 and an observation_2 table 860. In an embodiment, like the tables 752-760 illustrated in FIG. 7A, the tables 852-860 illustrated in FIG. 8A store data for different vertices that make up a graph database. The virtual vertex table 810 includes data from all five relational database tables 852-860.

The virtual edge table 830, is made up of relationships between these relational database tables. For example, as illustrated in FIG. 8A, the virtual edge table 830 is made up of edges between three of the vertex tables. In this illustration, the virtual edge table 830 includes edges between the chronic disease table 856, the observation_1 table 858, and the observation_2 table 860. In an embodiment, a configuration file is used to map the virtual vertex table 810 and the virtual edge table 830 to the underlying relational database tables.

FIGS. 8B-8C illustrate a configuration file 802 used to map a virtual vertex table 810 and a virtual edge table 830 to underlying relational database tables. For example, as illustrated, the configuration file 802 maps the virtual vertex table ("v.table") to the PATIENT, DIAGNOSIS, CHRONICDISEASE, OBSERVATION_1, and OBSERVATION_2 tables (e.g., the tables 852-860 illustrated in FIG. 8A). The virtual edge table 830, rather than including its own identifier (e.g., the "EID" illustrated in FIG. 7B), uses identifiers from the vertex tables. For example, the first row in the virtual edge table 830 uses a combination of PATIENT_ID, DIAGNOSIS_ID, and chronicdisease as an identifier. In an embodiment, the configuration file 802 maps the virtual edge table columns to underlying relational database columns.

FIG. 9 illustrates translation from graph database operations to relational database queries, according to one embodiment. For example, as illustrated in FIG. 9, a graph middle layer (e.g., the graph middle layer 212 illustrated in FIGS. 3-4) translates a graph operation 910 (e.g., a Gremlin graph query) into a relational query 920 (e.g., a SQL query). Thus, the graph middle layer (e.g., the dialect module 322 illustrated in FIG. 3) can translate the Gremlin operation g.V(ids) into the SQL query "for v in V_Tables: SELECT*FROM v WHERE v.vid IN ids". FIG. 9 illustrates numerous examples of translation from Gremlin operations to SQL operations. These are merely examples, and person of ordinary skill will understand that other operations can be translated. Further, a person of ordinary skill will understand that that other graph languages and relational query languages can be used.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the graph middle layer 212) or related data available in the cloud. For example, the graph middle layer 212 could execute on a computing system in the cloud and act as an overlay between a query for a graph database and data stored in an underlying relational database.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   receiving a graph database query requesting data from a graph database, the graph database comprising a plurality of vertices and a plurality of edges;
   translating, using one or more computer processors, the graph database query into a relational database query, the relational database query referencing a vertex table and an edge table in a relational database, the vertex table relating to the plurality of vertices in the graph database and the edge table relating to the plurality of edges in the graph database, the translating comprising:
      identifying a first step in the graph database query that accesses the graph structure;
      determining that a second step in the graph database query, subsequent to the first step in the graph database query, can be folded into the first step, comprising:
         determining that translating a composite step for the graph database query, combining the first step and the second step, results in a more efficient relational database query compared to translating both the first step and the second step,
      wherein the translating the composite step provides the same query result as the translating both the first step and the second step;
   modifying the graph database query, prior to the translating the graph database query into the relational database query, by replacing the first step and the second step with the composite step in the graph database query; and
   generating the relational database query based on the modified graph database query; and
   retrieving result data from the relational database corresponding with the graph database query by executing the relational database query against the relational database.

2. The method of claim 1, further comprising:
   constructing, using the one or more computer processors, a graph topology mapping between the graph database and the relational database, wherein the translating the graph database query into the relational database query uses the constructed graph topology.

3. The method of claim 2, wherein the graph topology comprises a mapping between the plurality of vertices in the graph database and the vertex table in the relational database and between the plurality of edges in the graph database and the edge table in the relational database.

4. The method of claim 3, wherein the vertex table comprises a virtual vertex table relating to a plurality of individual vertex tables in the relational database.

5. The method of claim 4, wherein constructing the graph topology comprises using a configuration file to map between the virtual vertex table and the plurality of individual vertex tables in the relational database.

6. The method of claim 3, wherein the edge table comprises a virtual edge table relating to a plurality of individual edge tables in the relational database.

7. The method of claim 3, wherein the edge table comprises a virtual edge table relating to a plurality of individual vertex tables in the relational database.

8. The method of claim 1, wherein the translating is performed by a graph middle layer implemented in the relational database.

9. The method of claim 1, further comprising:
   generating a graph result structure relating to the graph query; and
   filling the graph result structure with the result data retrieved from the relational database.

10. The method of claim 1, wherein determining that translating the composite step results in the more efficient relational database query compared to translating both the first step and the second step comprises determining that a first relational database query generated by translating the composite step uses less memory than a second relational database query generated by translating both the first step and the second step.

11. A system, comprising:
   one or more computer processors; and
   a memory containing a program that, when executed on the one or more computer processors, performs an operation, the operation comprising:
      receiving a graph database query requesting data from a graph database, the graph database comprising a plurality of vertices and a plurality of edges;
      translating, using the one or more computer processors, the graph database query into a relational database query, the relational database query referencing a vertex table and an edge table in a relational database, the vertex table relating to the plurality of vertices in the graph database and the edge table relating to the plurality of edges in the graph database, the translating comprising:

identifying a first step in the graph database query that accesses the graph structure;

determining that a second step in the graph database query, subsequent to the first step in the graph database query, can be folded into the first step, comprising:

determining that translating a composite step for the graph database query, combining the first step and the second step, results in a more efficient relational database query compared to translating both the first step and the second step, wherein the translating the composite step provides the same query result as the translating both the first step and the second step;

modifying the graph database query, prior to the translating the graph database query into the relational database query, by replacing the first step and the second step with the composite step in the graph database query; and generating the relational database query based on the modified graph database query; and retrieving result data from the relational database corresponding with the graph database query by executing the relational database query against the relational database.

12. The system of claim 11, the operation further comprising:

constructing, using the one or more computer processors, a graph topology mapping between the graph database and the relational database, wherein the translating the graph database query into the relational database query uses the constructed graph topology.

13. The system of claim 12, wherein the graph topology comprises a mapping between the plurality of vertices in the graph database and the vertex table in the relational database and between the plurality of edges in the graph database and the edge table in the relational database.

14. The system of claim 13, wherein the vertex table comprises a virtual vertex table relating to a plurality of individual vertex tables in the relational database.

15. The system of claim 11, wherein the translating is performed by a graph middle layer implemented in the relational database.

16. A computer program product for responding to a graph database query, the computer program product comprising:

a non-transitory computer-readable storage medium having computer-readable program code embodied therewith, the computer-readable program code executable by one or more computer processors to perform an operation, the operation comprising:

receiving the graph database query requesting data from a graph database, the graph database comprising a plurality of vertices and a plurality of edges;

translating, using the one or more computer processors, the graph database query into a relational database query, the relational database query referencing a vertex table and an edge table in a relational database, the vertex table relating to the plurality of vertices in the graph database and the edge table relating to the plurality of edges in the graph database, the translating comprising:

identifying a first step in the graph database query that accesses the graph structure;

determining that a second step in the graph database query, subsequent to the first step in the graph database query, can be folded into the first step, comprising:

determining that translating a composite step for the graph database query, combining the first step and the second step, results in a more efficient relational database query compared to translating both the first step and the second step, wherein the translating the composite step provides the same query result as the translating both the first step and the second step;

modifying the graph database query, prior to the translating the graph database query into the relational database query, by replacing the first step and the second step with the composite step in the graph database query; and generating the relational database query based on the modified graph database query; and retrieving result data from the relational database corresponding with the graph database query by executing the relational database query against the relational database.

17. The computer program product of claim 16, the operation further comprising:

constructing, using the one or more computer processors, a graph topology mapping between the graph database and the relational database, wherein the translating the graph database query into the relational database query uses the constructed graph topology.

18. The computer program product of claim 17, wherein the graph topology comprises a mapping between the plurality of vertices in the graph database and the vertex table in the relational database and between the plurality of edges in the graph database and the edge table in the relational database.

19. The computer program product of claim 18, wherein the vertex table comprises a virtual vertex table relating to a plurality of individual vertex tables in the relational database.

20. The computer program product of claim 16, wherein the translating is performed by a graph middle layer implemented in the relational database.

* * * * *